July 13, 1943.                S. T. SMITH                2,323,943
                        MULTIPLE BAR SHAFT COUPLING
                           Filed May 4, 1942           3 Sheets-Sheet 1

INVENTOR.
Skardon T. Smith
BY Myron J. Dikerman
                ATTORNEY

July 13, 1943.  S. T. SMITH  2,323,943
MULTIPLE BAR SHAFT COUPLING
Filed May 4, 1942  3 Sheets-Sheet 2

INVENTOR.
Skardon T. Smith
BY Myron J. Diksman
ATTORNEY

July 13, 1943.  S. T. SMITH  2,323,943
MULTIPLE BAR SHAFT COUPLING
Filed May 4, 1942  3 Sheets-Sheet 3

INVENTOR.
Shardon T. Smith
BY Myron J. Diksman
ATTORNEY

Patented July 13, 1943

2,323,943

UNITED STATES PATENT OFFICE 2,323,943

MULTIPLE BAR SHAFT COUPLING

Skardon T. Smith, Detroit, Mich.

Application May 4, 1942, Serial No. 441,673

1 Claim. (Cl. 192—45.1)

This invention relates to an improvement of my former locking device described in Patent No. 1,835,349, dated Dec. 8, 1931, and herein provides means for adapting the lock bar to an automatic multiple shaft coupling.

The object of my invention is to provide a shaft coupling adapted for free wheeling in one direction whenever an excessive rotating force is applied through the driven unit.

Another object is to produce an automatic locking and unlocking coupling for adjoining shaft sections, that will lock together when the rotating force is applied in one direction through the driving shaft section, but will unlock if the rotating force is applied through the driven shaft section rotating in the same direction.

A further object is to provide a multiple bar automatic shaft coupling that is simple in construction, easily and effectively operated and that can be manufactured at a low cost.

These several objects are attained in the preferred form by the construction and arrangement of parts more fully hereinafter set forth.

Similar parts on all drawings are marked by similar numerals or letters.

Figure 1:
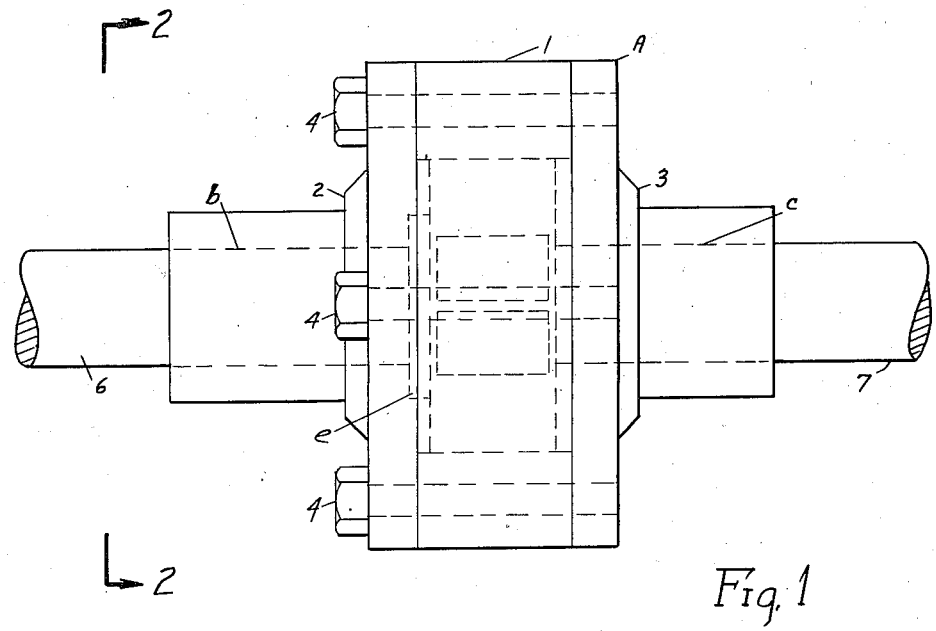
Fig. 1 is an elevation of an assembled unit showing the application of the coupling to adjoining shaft sections.
Figure 2:
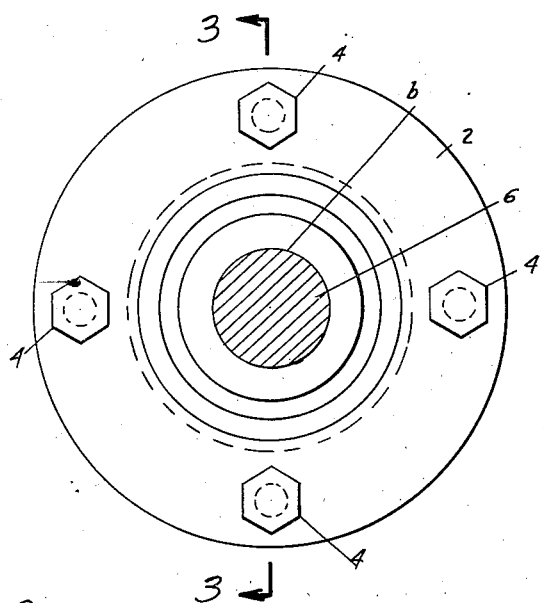
Fig. 2 is an end view taken on the line 2—2 of the Fig. 1 showing the general formation of the unit housing.
Figure 3:
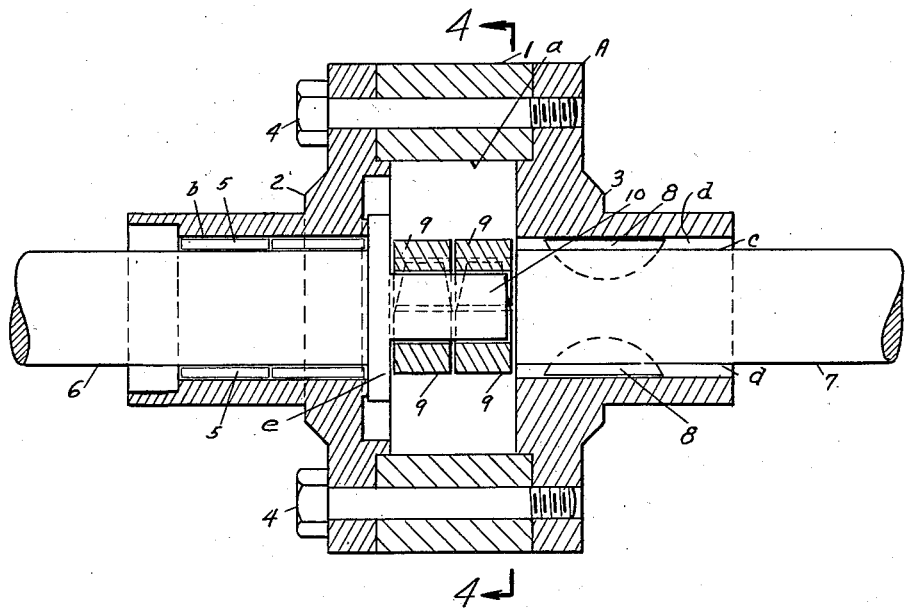
Fig. 3 is a sectional view, except for the central shaft units, taken on the line 3—3 of Fig. 2, showing the general arrangement of the operating parts.

In general, my device comprises a cylindrical housing formed with concentric shaft recesses opening through opposite ends thereof. The housing is fixedly attached to a driven shaft section, and the driving shaft section is rotatably mounted within the opposite end shaft recess, said shaft end being provided with a flattened cylindrical lug symmetrically positioned about the shaft axis, designed to engage and operate oppositely disposed lock bars also mounted within the housing chamber, in a manner to lock or unlock with the housing chamber wall.

I will now describe more fully the detailed construction of my device, referring to the drawings and the marks thereon.

The housing A is preferably formed of a cylindrical brake ring 1 having end housing caps 2 and 3 rigidly mounted on opposite ends thereof by the stud bolts 4. The brake ring 1 is formed a true cylindrical section, preferably with hardened and ground inner cylindrical inner surface $a$. Both the end caps 2 and 3 are likewise turned sections formed with cylindrical shaft recesses $b$ and $c$ respectively, and positioned concentric with the brake ring axis. The shaft recess $b$ of the end cap 2 is a bearing unit and is preferably provided with a suitable roller bearing 5, and receives therein, rotatably, the driving shaft section 6. The opposite end cap recess $c$ is fixedly mounted on the end of the driven shaft section 7 by means of the key 8 engaged within the splined groove $d$ formed in the end cap collar, thus causing the assembled housing A to rotate with the shaft section 7 as an integral part thereof. The driving shaft section 6 is retained in a predetermined position within the housing bearing $b$ by means of the attached collar $e$. Within the brake ring 1 are mounted multiple lock bars 9, arranged in pairs, oppositely disposed, and having their exterior ends formed with cylindrical surfaces of a diameter slightly smaller than the inclosing ring surface $a$, thus allowing for a slight sidewise displacement when an excentric force is applied thereto. The lock bar ends are designed to contact and engage the brake ring wall $a$ at a pre-determined locking angle whenever so displaced under pressure. Each lock bar 9 is formed with a central recess wall $f$ and a release hook $g$ as shown in the Fig. 4 of the drawings. The collar $e$ of the driving shaft 6 is provided with a flattened cylindrical turning plug 10 extended aximetrically therefrom, positioned diametrically across the entire collar face. The turning lug 10 is of a design and size to fit between the respective pairs of lock bars 9, engaging both face $f$ and release hook $g$ of each bar.

Figure 4:
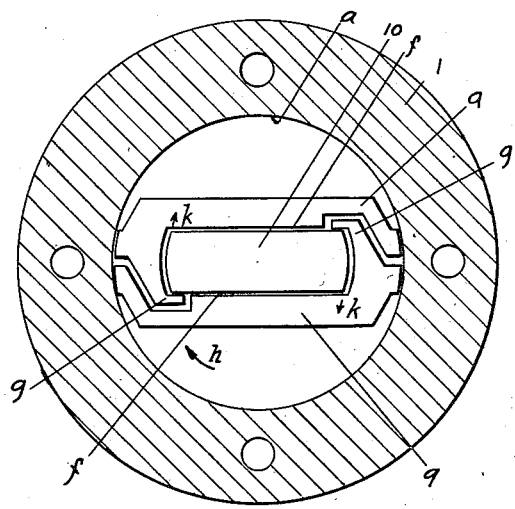
Fig. 4 is a cross-sectional view taken on the line 4—4 of the Fig. 3, showing the relative position of the operating lugs and connected lock bars.
Figure 5:
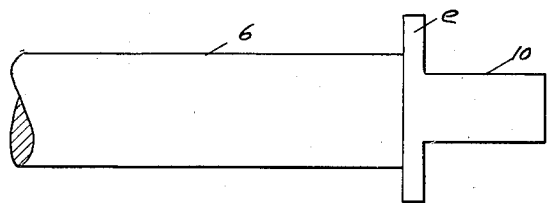
Figs. 5 and 6 show details of the driving shaft end lug.
Figure 6:
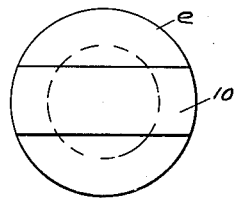
Figure 7:
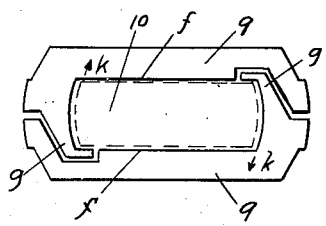
Figs. 7 and 8 show the detail of a pair of lock bars and their relative position with the driving shaft lug.
Figure 8:
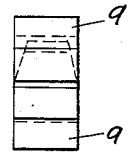
Figure 9:
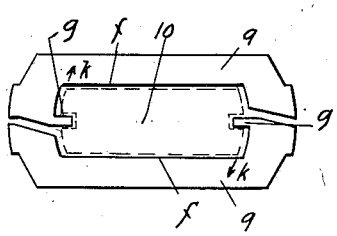
Figs. 9 and 10 illustrate a modified form of lock bar designed to engage a lug groove instead of the exterior lug wall.
Figure 10:
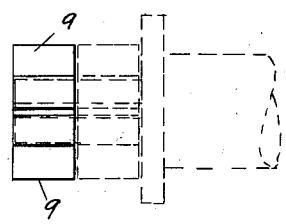

It can readily be seen that when a turning power is applied through the driving shaft section 6 in the direction of the arrow $h$ shown in the Fig. 4, the shaft lug 10 will engage all lock bars 9 at contact $k$ and force them in a locking position with the ring surface $a$, thus locking the entire assembly together, rotating the housing and connected shaft section 7 as a single unit. However if the turning force is applied through the driven shaft section 7, in the same direction, the release hooks g will disengage all lock bars 9 from the housing walls, and centralize said lock bars to a free turning position, allowing the shaft 7 and housing to rotate freely on the driving section 6, and may continue even after the shaft 6 is stopped.

Having fully described my multiple bar shaft coupling, what I claim as my invention and desire to secure by Letters Patent is:

A multiple bar shaft coupling adapted for automatically releasing a connected driven shaft section whenever an excessive force is applied therethrough, comprising a housing casing formed with a central cylindrical chamber provided with connected shaft recesses through opposite ends thereof concentric with the housing chamber axis, a driving shaft section rotatably mounted through one end recess, a driven shaft section fixedly mounted through the opposite end housing shaft recess and made integral with the housing casing, a flattened cylindrical operating lug having oppositely positioned parallel sides formed on the inner end of the driving shaft section, positioned symmetrically about the shaft axis and projected within the housing chamber, pairs of oppositely disposed lock bars formed with circular ends and lug release means rotatably mounted within the housing chamber, designed to lock with the chamber walls under pressure, and positioned to be automatically displaced outwardly by the operating lug force applied through the driving shaft section, and released from the walls when rotation force is excessive and applied through the driven section.

SKARDON T. SMITH.